(No Model.)
S. R. EDNEY.
CLAMP FOR BROOM HEADS.
No. 423,744. Patented Mar. 18, 1890.
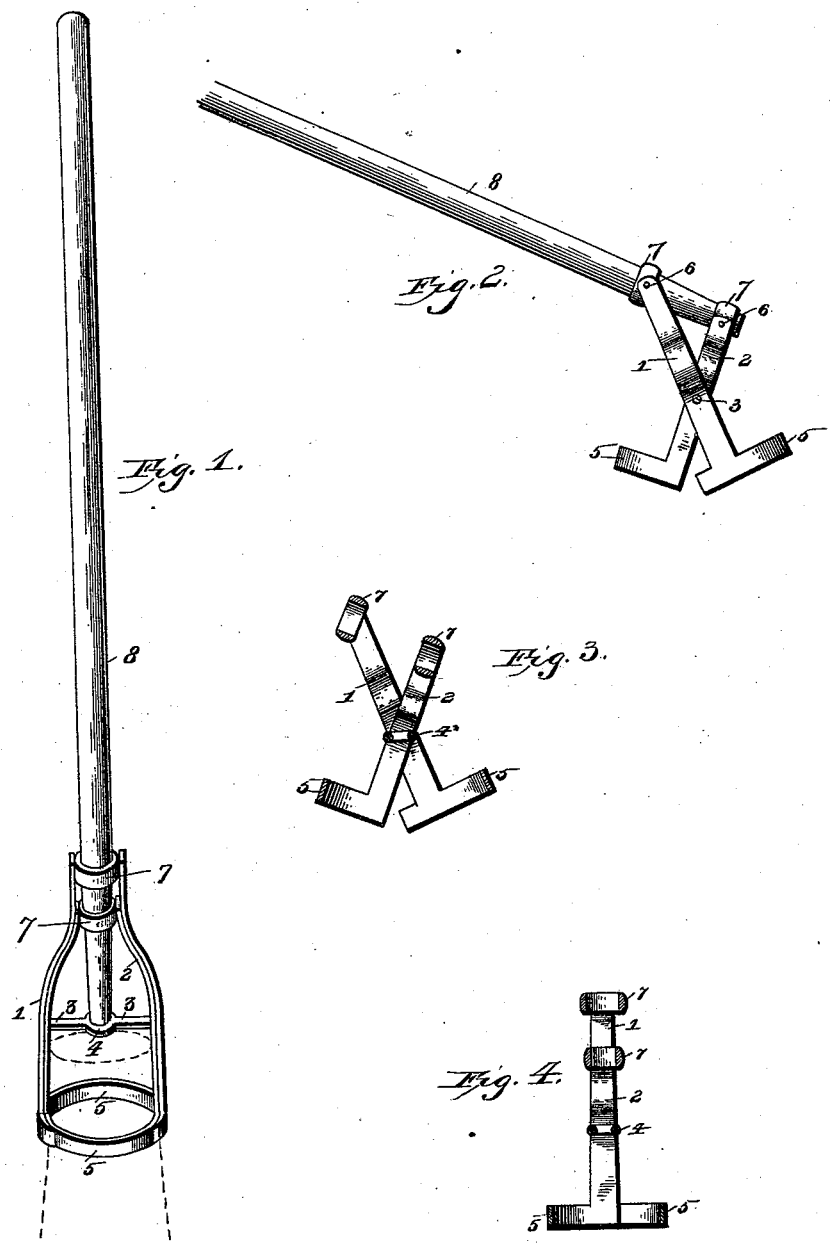

UNITED STATES PATENT OFFICE.

SAMUEL R. EDNEY, OF SOUTH MILLS, NORTH CAROLINA, ASSIGNOR OF ONE-HALF TO JOHN K. ABBOTT, OF SAME PLACE.

CLAMP FOR BROOM-HEADS.

SPECIFICATION forming part of Letters Patent No. 423,744, dated March 18, 1890.

Application filed December 4, 1889. Serial No. 332,551. (No model.)

*To all whom it may concern:*

Be it known that I, SAMUEL R. EDNEY, a citizen of the United States, and a resident of South Mills, in the county of Camden and State of North Carolina, have invented certain new and useful Improvements in Clamps for Broom-Heads; and I do hereby declare that the following is a full, clear, and exact description of the invention, which will enable others skilled in the art to which it appertains to make and use the same.

My invention relates to improvements in broom heads or clamps, by means of which the broom corn and handle may be readily connected with and disconnected from each other, no wires, bolts, nuts, or other similar devices being employed for attaching or securing the corn or other material to the handle.

The invention consists in a pair of clamping-levers pivoted at or near their centers, and provided at one end with clamping-jaws and at the other end with pivoted loops or rings and with a pivoted central loop or ring, as will be hereinafter more fully described and claimed.

In the accompanying drawings, Figure 1 is a perspective view of a clamping device constructed in accordance with my invention, the handle being inserted and the corn clamped in place. Fig. 2 is a side view of the clamp with the jaws distended to receive the corn and the handle inserted. Fig. 3 is a central sectional view of the clamp with the jaws distended with the corn and handle removed, and Fig. 4 a similar view with the jaws closed.

In the said drawings, the reference-numerals 1 and 2 designate a pair of levers, pivoted together at or near their centers by means of the pivot-pin 3, which has a central ring or loop 4 to receive the end of the handle, as will be hereinafter described. At one end the levers of each pair are connected by means of a jaw or jaws 5, which in the present instance are shown to be of segmental form. At the other ends the levers are connected together by pivot-pins 6, connected with or forming part of the rings or loops 7.

The levers 2 2 are somewhat shorter than the levers 1 1, so as to be inclosed thereby when the clamp is closed; but otherwise they are duplicates of each other.

The numeral 8 designates the handle. The pivots of rings 7 7 and 4 are capable of freely turning within their bearings, so as to be oscillated or rotated therein.

The operation of the device is as follows: The jaws being distended, as shown in Fig. 2, to receive the corn or other sweeping material between the jaws 5, the opposite ends of the levers will also be distended or spread apart. After the corn has been placed between the jaws the handle is inserted in the rings 7 7, as shown in Fig. 2, this being easily effected, owing to their being movable on their pivots in said levers. It will be seen that the handle thus forms a lever, its fulcrum being at the outside ring, and as the rear end of the handle is moved inward, or toward the axial line of the clamp, the short arm of the lever will cause the levers 1 1 and 2 2 to turn upon their pivots and their ends be brought together and in line with each other, as seen in Fig. 4, and the corn be held and clamped firmly and securely between the jaws 5. It will be apparent that great leverage is exerted by the handle upon the levers 1 and 2 and great power consequently exerted by the clamping-jaws. The end of the handle is then inserted in the ring 4, which securely holds all the parts in position and prevents any lateral movement of the handle within the clamp.

My invention is principally designed for use in connection with brooms; but it is obvious that it may be applied with advantage and with equal beneficial results to paint-brushes, mops, and other similar articles. In such cases it may be found necessary to vary the shape of the jaws 5; but otherwise the construction is the same and the character of the invention not departed from.

Having thus described my invention, I claim and desire to secure by Letters Patent of the United States—

A broom-clamp consisting of the two pairs of levers pivoted together at or near the centers, a ring secured between the levers of one pair at the pivot-points, clamping-jaws connecting one end of each pair, and pivoted rings in the other ends of each pair of levers, substantially as described.

In testimony that I claim the foregoing as my own I have hereunto affixed my signature in presence of two witnesses.

SAMUEL R. EDNEY.

Witnesses:
JOHN F. FOSTER,
JNO. H. POOL.